United States Patent [19]
Catlin

[11] Patent Number: 5,265,199
[45] Date of Patent: Nov. 23, 1993

[54] METHOD AND APPARATUS FOR ACCOMPLISHING Z-BUFFERING BY PREDICTION

[75] Inventor: Gary Catlin, Cupertino, Calif.

[73] Assignee: Silicon Graphics, Inc., Mountain View, Calif.

[21] Appl. No.: 704,127

[22] Filed: May 22, 1991

[51] Int. Cl.⁵ .............................................. G06F 15/72
[52] U.S. Cl. ........................... 395/122; 395/250; 395/164
[58] Field of Search ................ 395/164, 122, 250, 375

[56] References Cited

U.S. PATENT DOCUMENTS

| | | | |
|---|---|---|---|
| 3,559,183 | 1/1971 | Sussenguth | 395/375 |
| 4,477,872 | 10/1984 | Losq et al. | 395/375 |
| 4,679,041 | 7/1987 | Fetter et al. | 340/747 |
| 4,951,232 | 8/1990 | Hannah | 395/122 |
| 4,991,080 | 2/1991 | Emma et al. | 395/375 |
| 5,005,117 | 4/1991 | Ikumi | 395/122 |
| 5,043,921 | 8/1991 | Gonzalez-Lopez et al. | 395/122 |
| 5,084,830 | 1/1992 | Doornink et al. | 395/164 |

*Primary Examiner*—Dale M. Shaw
*Assistant Examiner*—D. Dinh
*Attorney, Agent, or Firm*—Blakely, Sokoloff, Taylor & Zafman

[57] ABSTRACT

A method for accelerating the writing of data to a Z buffer including the steps of reading the Z value presently stored at a position in the Z buffer; writing a new Z value to the position in the Z buffer if the result of a last available comparison in a sequence of comparisons wrote a new Z value to a position in the Z buffer, writing the Z value read back to the position in the Z buffer if the result of a last available comparison in a sequence of comparisons wrote the Z value read back to a position in the Z buffer, and comparing the Z value read from the position of the Z buffer with the new Z value; and rewriting the correct value to the Z buffer if the comparison of the Z value read from the position of the Z buffer with the new Z value demonstrates that the value written was incorrect.

7 Claims, 7 Drawing Sheets

METHOD AND APPARATUS FOR ACCOMPLISHING Z-BUFFERING BY PREDICTION

BACKGROUND OF THE INVENTION

1. Field Of The Invention

This invention relates to display memory systems and, more particularly, to methods and apparatus for accelerating the rate at which data defining the depth of a three dimensional image may be stored in a depth (Z) buffer memory.

2. History Of The Prior Art

A typical computer system generates data which is displayed on an output display. This output display is typically a cathode ray tube which produces a number of full screen images one after another so rapidly that to the eye of the viewer the screen appears to display constant motion when a program being displayed produces such motion. In order to produce the individual images (frames) which are displayed one after another, data is written into a frame buffer. The frame buffer stores information about each position on the display which can be illuminated (each pixel) to produce the full screen image. For example, a display may be capable of displaying pixels in approximately one thousand horizontal rows each having approximately twelve hundred pixels. All of this information in each frame is written to the frame buffer before it is scanned to the display.

The data which defines each pixel may vary from the amount necessary to describe a simple black and white monochrome output to that required to describe a great number of colors and shades of those colors. For example, a typical color pixel in more advanced systems is defined by eight bits each of red, green, and blue color information, and an additional eight bits of alpha (luminosity) information.

If, in addition, the system is capable of displaying three dimensional images, some amount of data regarding the depth of each pixel is necessary. In a typical system, twenty-four bits may be stored to record the depth or Z value of each pixel. This information is stored in a buffer memory referred to as a Z buffer which is associated with the frame buffer. A Z buffer used with a frame buffer which stores data for 1280 by 1024 pixels thus contains memory for storing twenty-four bits of data at 1280 by 1024 positions on the display.

When data describing an entire frame exists in the frame buffer, the data describing the frame may be transferred to the display. Typically, data is transferred from the frame buffer to the display pixel by pixel and line by line beginning at the upper left hand corner of the display and proceeding horizontally from left to right, line by line, downwardly to the lower right hand corner of the display. In order for the picture to appear continuous on the output display, the successive frames in the frame buffer must be constantly scanned to the output display at a rate of sixty frames per second or more. Scanning this large number of frames to the display each second allows the eye to integrate the images so that it sees no single frame but a smoothly flowing continuous sequence of motion without any visible flickering when motion is presented.

While each frame of data is being scanned to the display, new data to appear in the next frame must be transferred to the frame buffer and to the associated Z buffer. Since so many frames are necessary each second in order to describe motion, an enormous amount of data must be written to the frame buffer and its accompanying Z buffer to sustain the rate at which information is scanned to the display.

When three dimensional data is being written to the frame buffer so that it may be scanned to the display, it is necessary to compare the depth of each new pixel with the depth of the pixel presently stored in the position of that pixel in the frame buffer to see whether the new pixel data appears in front of the pixel being displayed. If so, the new pixel should be displayed instead of the old pixel; if not, the old pixel data remains. This comparison requires that data stored in the pixel position in the Z buffer be read, be compared to the new Z data, and, if necessary, the new Z data be written to the pixel position in the Z buffer. In a situation in which merely keeping up with the operation of writing is a problem, the time required for the read/compare/write operation may mean that swiftly moving operations cannot be presented on the display.

SUMMARY OF THE INVENTION

It is, therefore, an object of the present invention to increase the speed at which information may be written to a display memory system.

It is another more specific object of the present invention to increase the speed at which the read/compare/write operation in a Z buffer memory is accomplished.

These and other objects of the present invention are realized in a method for accelerating the writing of data to a Z buffer including the steps of reading the Z value presently stored at a position in the Z buffer; writing a new Z value to the position in the Z buffer if the result of a last available comparison in a sequence of comparisons wrote a new Z value to a position in the Z buffer, writing the Z value read back to the position in the Z buffer if the result of a last available comparison in a sequence of comparisons wrote the Z value read back to a position in the Z buffer, and simultaneously comparing the Z value read from the position of the Z buffer with the new Z value; and rewriting the correct value to the Z buffer if the comparison of the Z value read from the position of the Z buffer with the new Z value demonstrates that the value written was incorrect.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of he present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
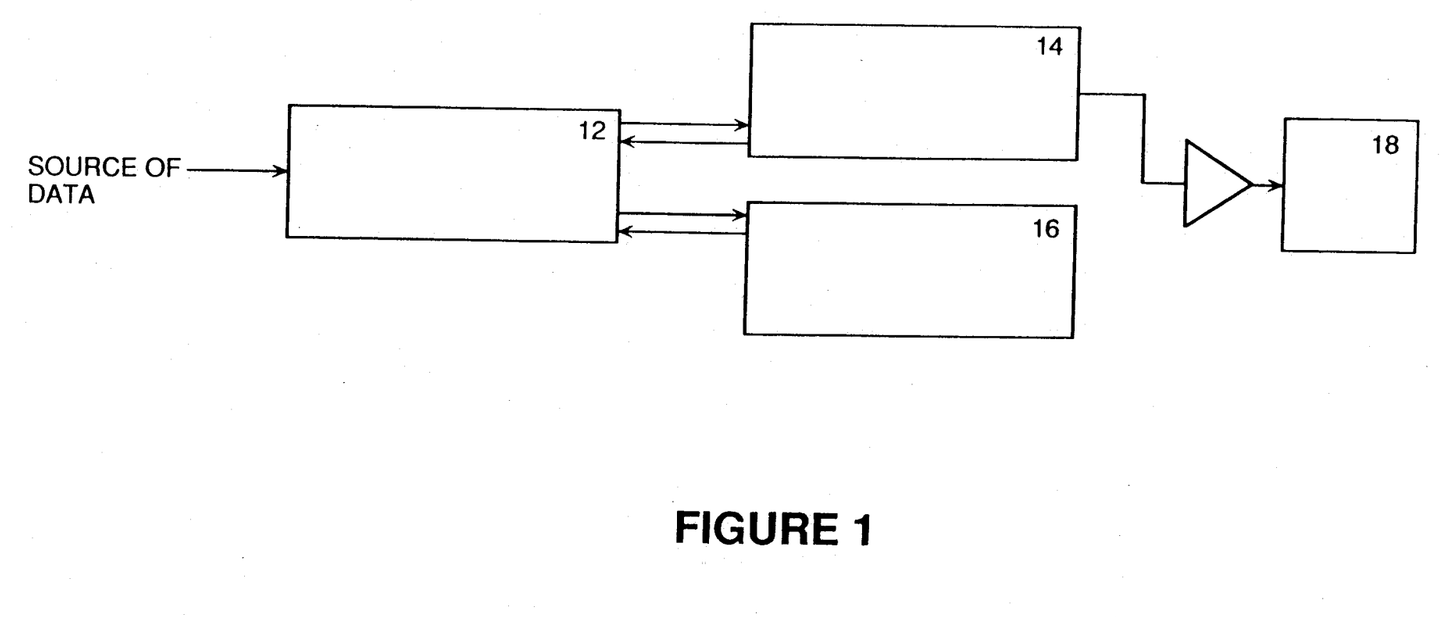
FIG. 1 is a block diagram illustrating a typical display memory system in accordance with the prior art.

Referring now to FIG. 1, there is shown a block diagram of a typical display memory system 10 for providing a three dimensional color display The system 10 includes a raster engine 12 which receives data to be displayed from a source (not illustrated in the figure) such as a central processing unit. The raster engine 12 generates the values of the pixels to be stored in a frame buffer 14 and the depth values to be stored in an associated Z buffer 16 and, in general, controls the operation of writing to the frame buffer 14 and the Z buffer 16. Typically, the raster engine 12 will be provided with pixel and depth values indicating a beginning and ending point of a line to be drawn. The raster engine 12 will compute for all the intervening points red, green, blue, and depth values so that a complete line may be drawn. Alternatively, the raster engine may be furnished a beginning point, color values at an end point, a length, and the slope values to an end point. From these, the same intervening values are computed.

The frame buffer 14 contains a number of memory positions sufficient to store data for each of the pixels to be presented on an output display device 18. In a typical color display system, there may be 1280 by 1024 positions displayed on the output display device 18. Each of these positions may contain twenty-four bits of data describing red, green, and blue colors which will be combined to produce the color to be displayed at the pixel.

Figure 2:
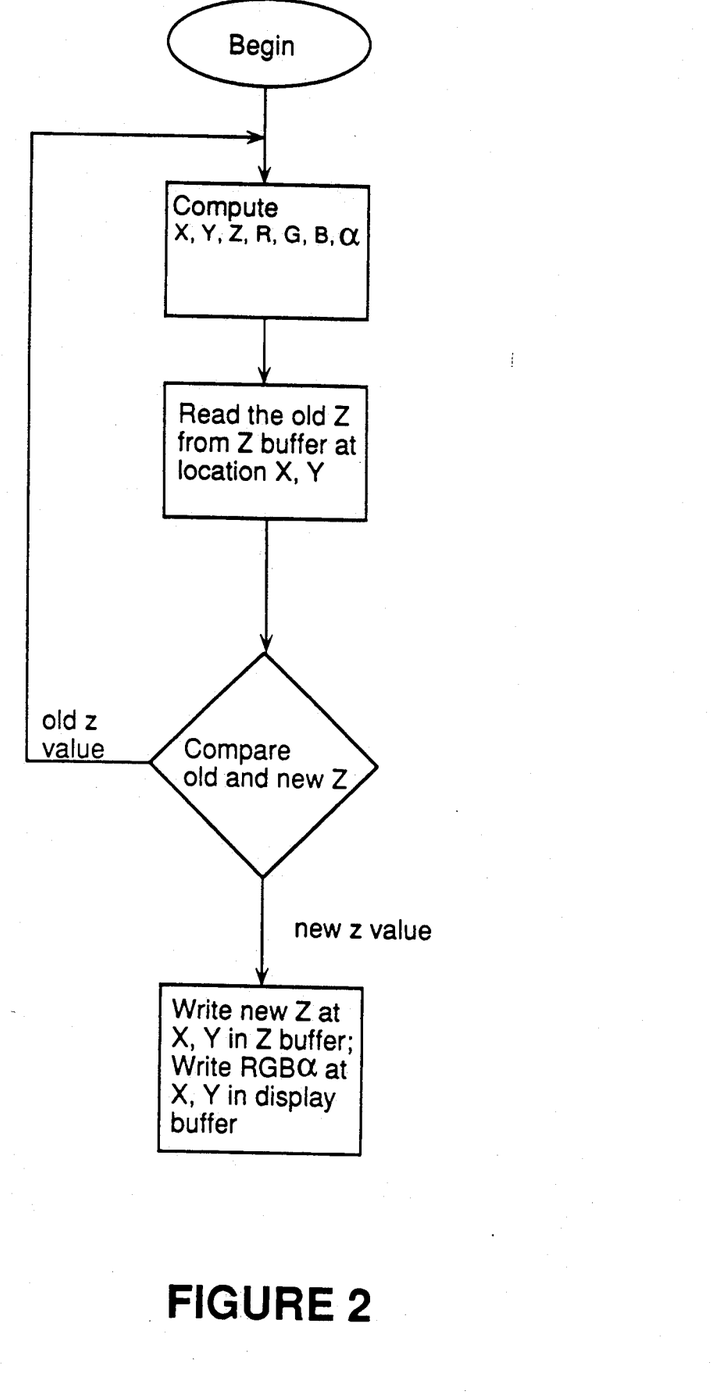
FIG. 2 is a flow chart illustrating a typical compare operation in a Z buffer of a display memory of the prior art.

For each position of the frame buffer 14 to be displayed, a position exists in the Z buffer. In a typical display system, this position contains twenty-four bits of storage for binary information defining the depth of the pixel to be displayed. As each new pixel is presented to be written to the frame buffer, a comparison is made under control of the raster engine of the depth of the new pixel with the depth of the pixel presently stored in the frame buffer. If the new pixel is closer to the screen of the display than is the stored pixel, then the new pixel will be i front of the old pixel so the new pixel is written to the frame buffer and its depth is stored in the Z buffer. A flow chart outlining this process is shown in FIG. 2.

This depth comparison is typically made by the raster engine 12 or under its control. The engine 12 reads the Z value at the pixel position in the frame buffer, compares that value with the Z value of the new pixel, determines whether the new pixel is closer to the screen than the old, and overwrites the old pixel in the frame buffer 14 and the Z value in the Z buffer if the new pixel is nearer to the screen of the output display device.

In order to write to the frame buffer rapidly enough to sustain continuous motion, it is necessary to write data to the frame buffer at the rate of one pixel per clock where the clock frequency is fifty megahertz. This allows data describing fifty million pixels to be written each second.

Typically, the read of the old Z value at any pixel position requires six clock cycles, the time to realize a result from the compare operation takes another four clock cycles. Thus, at the end of ten clock cycles, the raster engine 12 has the result which allows it to write the new values to the frame buffer and the Z buffer if the new pixel is closer to the screen of the display than is the old. This write takes an additional four cycles.

A simple addition shows that the ten to fourteen clock cycles required for each compare operation do not fit the need for pixel data to be written in one clock cycle. However, by using ten interleaved banks of memory and beginning a read/compare cycle on a first clock cycle at the first bank, another read/compare cycle on the next clock cycle at the second bank, and so on, the read/compare cycles may be pipelined so that the effective time for each is reduced to a single clock cycle. However, this does not solve the problem of how to accomplish a four clock cycle write operation in the same ten clock cycle interval so that the entire operation may be effectively reduced to one clock cycle by the pipeline. When this four clock cycle value is added to the ten clock cycles necessary to complete the compare, the time to complete the operation is something over one clock cycle even with the interleaving of ten memory banks.

The present invention reduces the length of the operation so that most comparisons are accomplished and the pixel data is written in the required ten clock cycles to maintain the desired pipelined rate. The invention is based upon the realization that most write operations occur in long sequences of pixels. That is, write operations to a frame buffer are typically of polygonal shapes (triangles in the preferred embodiment) which make up surfaces. These are scanned to the display as a series of adjacent horizontal line segments. If a typical surface lies in front of another surface, then all of the positions in each of the line segments defining a polygon making up the surface will typically lie in front of the other surface. If a typical surface lies in back of another surface, then all of the positions in each of the line segments defining a polygon of that surface will typically lie in back of the other surface. Typically, it is only where two surfaces intersect that a variation from this rule will occur; and then a first portion of a horizontal line in a polygon defining a surface will lie in front and the second portion in back, or vice versa. In any case, Z values furnished in sequence in writing pixels to a frame buffer will typically all be closer to the screen than old Z values for a long sequence or they will all be farther from the screen than old values for a long sequence.

This realization allows a prediction to be made that a Z value will be either closer to the screen or farther from the screen than was the old Z value if the new value immediately preceding the value being considered was closer or farther than its old Z value. Using this prediction when a new Z value is offered, the old Z value is first read; and then the new Z value is written to the Z buffer if on the most recent comparison the new Z value was written to the Z buffer and is not written if on the most recent comparison the new Z value was not written. Since the read cycle takes six clock periods and the write cycle takes four, this operation may be completed within the ten cycles of clock time available. At the same time that the new Z value is written or not written, the compare cycle is begun. Ordinarily, the comparison demonstrates that the value now in the Z buffer is the correct value. Thus, the operation may continue and will prove to, in fact, accomplish the entire operation within the allotted ten clock periods.

Where, however, two surfaces intersect or for some other reason the Z value comparison fails, it is necessary to rewrite the correct value instead of the value stored in the Z buffer. Since the result of the comparison is available at the same time as the completion of the write operation, the pipeline must be stalled for four additional clock cycles to accomplish this operation. This, in effect, means that four stages of the pipeline must be corrected before the operation is back in synchronization and the prediction operation works correctly again.

Figure 3:
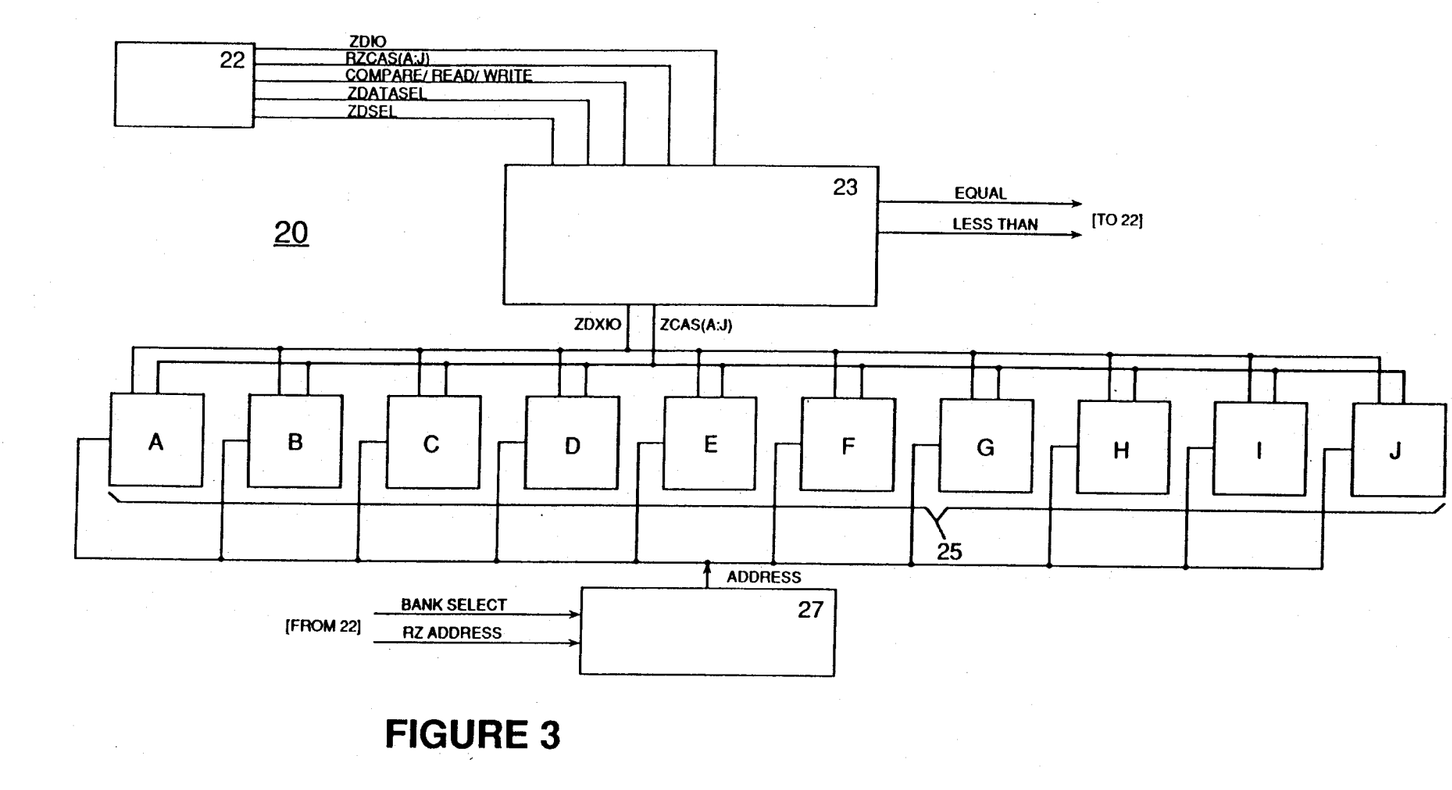
FIG. 3 is a block diagram illustrating the environment of the present invention.

FIG. 3 is a block diagram illustrating a system 20 in accordance with present invention for accomplishing the fast write operation described above. The system 20 includes a raster engine 22 which accomplishes the determination of the red, green, blue, and depth values to be written to the frame buffer and the Z buffer. The raster engine 22 furnishes these values to a circuit 23 which accomplishes the compare operations and provides values both for the fast write operation and for any fix up which is necessary where the result of the fast write is incorrect. The circuit 23 receives a number of control signals which are discussed in detail below. The circuit 23 is essentially a gate array which is used to interface the raster engine 22 to the data bus of the Z buffer. It should be noted that in order to keep the pin count down on the integrated circuits used for the circuit 23, a preferred embodiment of the invention divides the circuit 23 into three individual circuits each of which accomplishes the required write and compare operations for one of the three bytes of the Z buffer data. Since this has no bearing on the inventive concept, only a single circuit 23 is illustrated.

The circuit 23 is connected to transfer data to ten individual banks A-J of the Z buffer 25. These ten banks A-J provide the pipelining described above so that the length of the typical read/compare/write cycle may extend to ten clock cycles for each individual pixel but effectively require only one clock cycle when integrated over the pipeline. As with the circuit 23, each of the ten banks A-J in the preferred embodiment of the invention is divided into three portions one of which is associated with one of the three portions of the circuit 23. This division is not related to the invention so only one portion for each bank is illustrated.

A circuit 27 provides selection signals to the banks A-J of the Z buffer 25 so that the appropriate bank and positions are selected for each pixel to be written.

Figure 4:
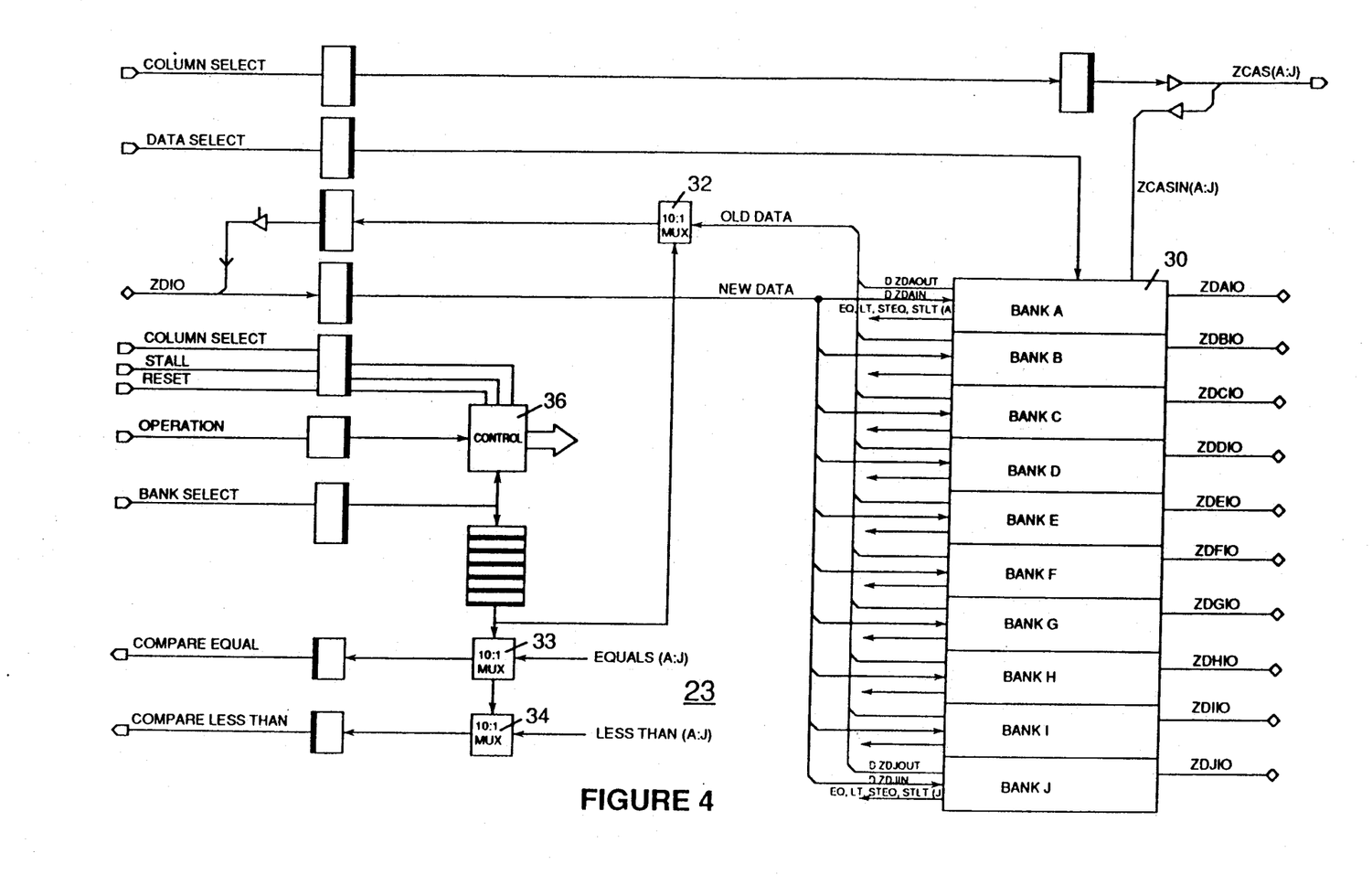
FIG. 4 is a block diagram illustrating a portion of the circuit of FIG. 3 in more detail.

FIG. 4 is a block diagram illustrating the circuitry of the circuit 23 in more detail. The circuit 23 includes a compare circuit 30. The compare circuit 30 is actually ten individual identical compare circuits identified by the designations Bank A through Bank J in the FIG. 4. Each of these compare circuits does the actual comparison for the bank of the Z buffer 25 having the same designation. To the right of each of the comparisons circuits is shown an input bus carrying the old data read from the Z buffer in the read operation. To the left of each of the individual comparison circuits is shown an input bus carrying the new data to be written into the Z buffer if the result of the compare operation so requires. To the left of each compare circuit is also shown a data bus out of the compare circuit to a multiplexor 32. The multiplexor 32 receives bank select signals so that the data transferred out is from the appropriate bank of the Z buffer 25. In addition, each bank of the compare circuit 30 provides output signals indicating the results of its compare operation. These signals are transferred back to the raster engine 22 by a pair of multiplexors 33 and 34 each of which multiplexes the signal from the appropriate bank in response to the bank select signal.

As may be seen in FIG. 4, each of the signals transferred to and from the circuit 23 is latched so that its appearance may be accurately determined at the fifty megahertz or higher clock frequency at which the circuitry is operating. These latches are all illustrated by a typical designation for a latch circuit but are not otherwise designated in the figure. In addition to the circuitry described, the circuit 23 also includes a control circuit 36 which receives a signal indicating the type of operation being conducted (READ, WRITE, COMPARE). In the present invention, only the compare operation is of interest. The control circuit also receives the bank select input signal so that the operation is conducted in the correct bank of the Z buffer. A number of control signals including a stall signal for freezing the pipeline when the frame buffer is busy, a reset signal, and a column select enable signal. These signals are utilized in a manner well known to the prior art to accomplish, among other things, the selection of the appropriate memory positions.

Figure 5:
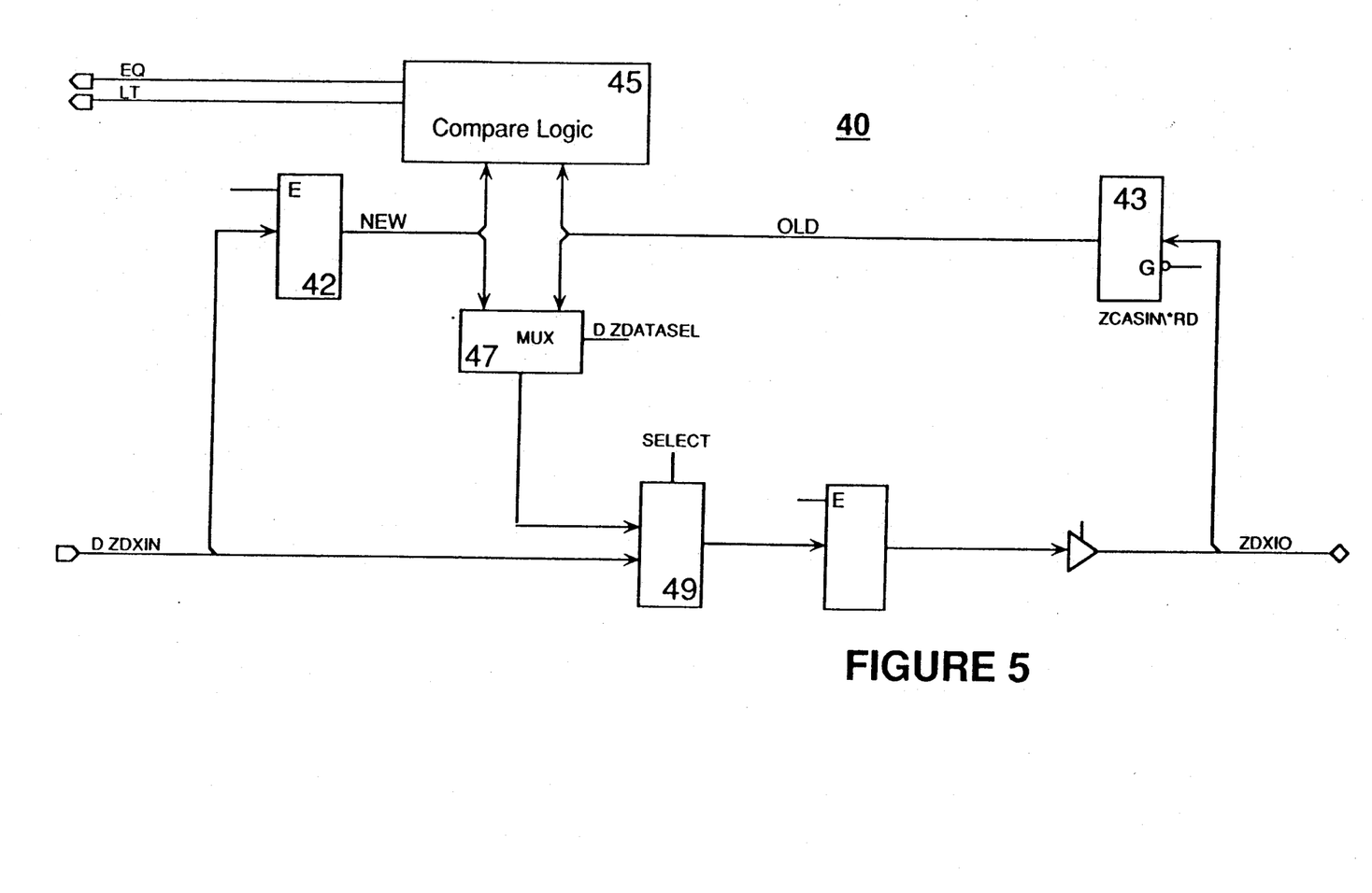
FIG. 5 is a block diagram illustrating a portion of the circuit of FIG. 4 in more detail.

FIG. 5 is a block diagram illustrating one of the compare circuits 40 which is identified as Bank A through Bank J of the circuit 30 of FIG. 4. As described, these individual compare circuits 40 are used in accordance with the invention for accomplishing the compare operation used in accelerating the read/compare/write operation in individual banks of a Z buffer. The circuit 40 includes a first register 42 in which the new Z value for the new pixel is stored when received. The circuit 40 also includes a register 43 in which the Z value of the old pixel stored at the position is stored when read from the Z buffer. When the read operation is complete and the old and new values are stored in the two registers 42 and 43, a select signal is provided by the raster engine to a multiplexor 47. The multiplexor 47 is connected to receive as inputs the two Z values stored in the registers 42 and 43. Thus, if the last compare which reached the raster engine 22 shows that the pixel defined by the new data was closer to the screen than was the old pixel, the Z value of the new data stored in register 42 is transferred. If the pixel defined by the old data was closer to the screen than was the new pixel, the Z value of the old data stored in register 42 is transferred. The value furnished by the multiplexor 47 is provided as input to a second multiplexor 49 which is used to select between data provided for a write operation and the data provided by the compare operation. A signal defining this as a compare operation selects the data provided by the result of the compare operation for writing back to the Z buffer. This is the value stored in the proper bank of the Z buffer immediately after the read of the old Z value.

The circuit 40 also includes a compare circuit 45 which receives the two values in the registers 42 and 43, compares those values, and provides a signal which indicates whether the new value is to be written. In a preferred embodiment of the invention, the circuit 40 provides a signal which indicates whether the new value is less than the old value and a signal indicating whether the new value is equal to the old value.

Figure 7:
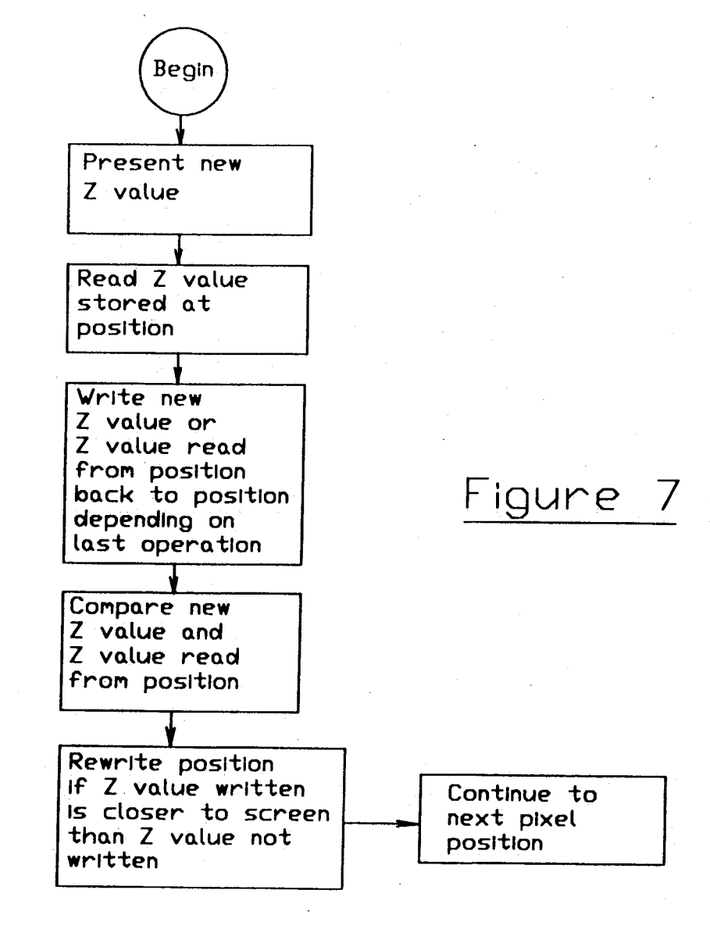
FIG. 7 is a flow chart illustrates a method in accordance with the present invention.

These signals produced by the compare circuit 45 are transferred back to the raster engine 22 where they are used to determine whether the data transferred to the Z buffer immediately after the read operation was correct. If the results of the compare show that the operation was correct, then there is no need to correct the data stored in the Z buffer and the writes to the Z buffer proceed at the rate of one per clock period. However, if the results of the compare operation show that the incorrect value was transferred, the correct value is furnished by the multiplexor 47. The multiplexor 47 is connected to receive the two Z values which remain stored in the registers 42 and 43. Thus, if the pixel defined by the new data is actually closer to the screen than is the old pixel while the old value was stored immediately after the read operation, the Z value of the new data stored in register 42 is transferred to correct the Z buffer. If the pixel defined by the old data is closer to the screen than is the new pixel as determined by the compare circuit 45 while the new data was written immediately after the read, the Z value of the old data stored in register 42 is transferred. The value furnished by the multiplexor 47 is transferred by the second multiplexor 49 in response to a signal defining this as a compare operation. The method described above is illustrated in FIG. 7.

Figure 6:
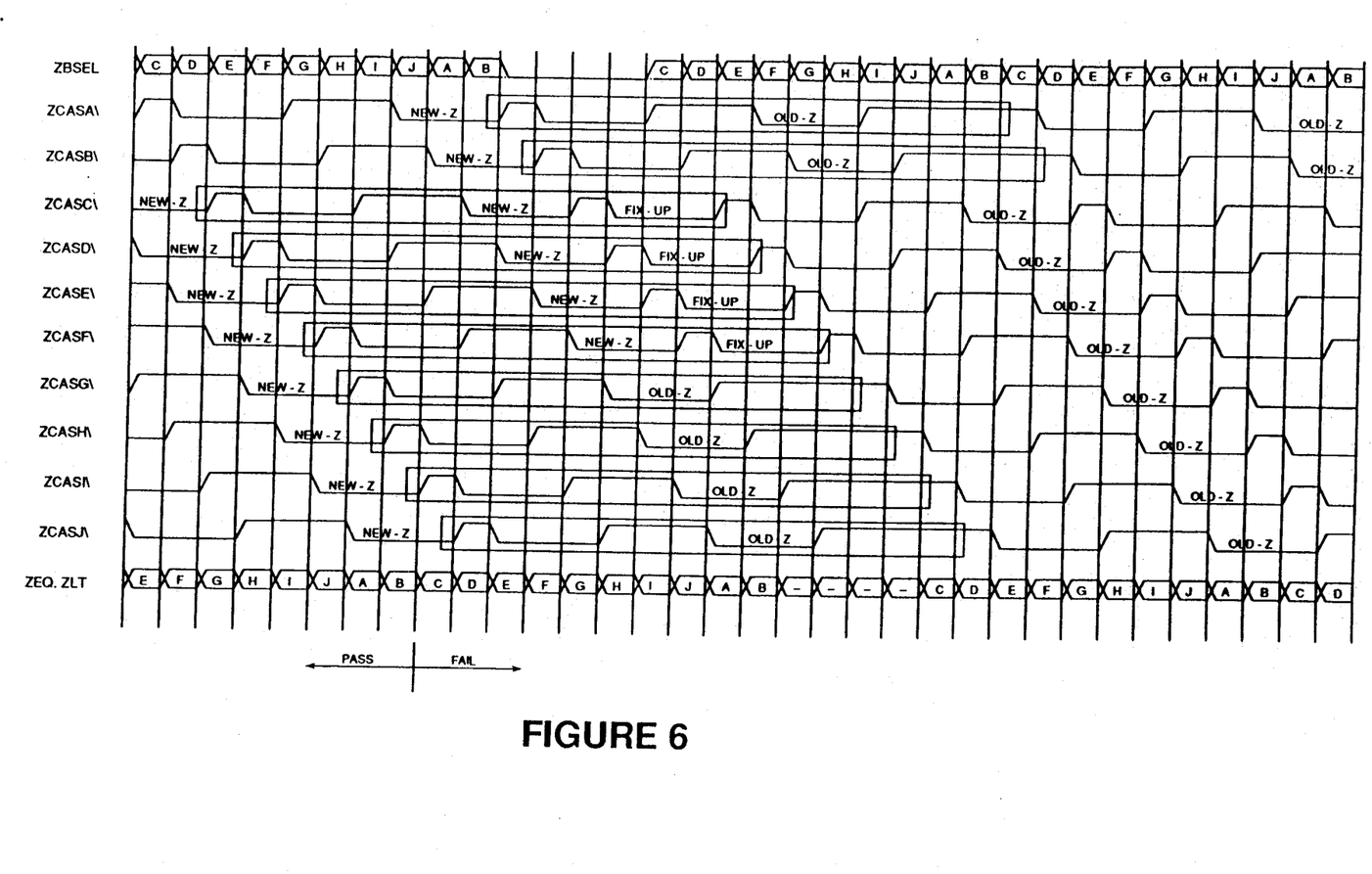
FIG. 6 is a timing diagram illustrating a series of read/compare/write operations in a Z buffer of a display memory designed in accordance with the present invention.

As may be seen from FIG. 5, and from the timing diagram of FIG. 6, once the comparison shows that a value was incorrectly written to the Z buffer, a total of four incorrect writes (at most) will probably have taken place. This occurs because the bank writes are pipelined at one write operation per clock and three additional writes in other banks will have occurred before the compare of the first is available. Thus, the pipeline is stalled for four clock cycles for each of the ten banks until the corrections have been made. From that point on, the fast writes will probably be correct again. This is clearly illustrated in the timing diagram of FIG. 6 which shows a sequence of Z compare passes followed by a sequence of Z compare failures. When the failure occurs, the time required for the corrective rewrite of the Z buffer banks is necessary with only the first four sequential banks of the Z buffer. However, all banks must be stalled for the extra four clock cycles to get the pipeline back into synchronization. Thus it will be seen that the present invention provides a Z buffer compare operation which typically takes place in a total of ten clock cycles and which may be pipelined to produce an overall time of one clock cycle per compare. Moreover, even when the arrangement is required to utilize a full fourteen clock cycles because the write was incorrectly predicted, the time taken is the time which would have been required in a circuit not utilizing the present invention. Thus, at its best, the invention provides substantial acceleration for the compare operation; and at its worst matches the speed of operation of the prior art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method including a series of steps practiced in a repeated sequence for accelerating the writing of data to a buffer memory used to store data indicating a depth of each pixel to be displayed on a display screen (a Z buffer), the series of steps of the method for storing a depth of each pixel in sequence including the steps of receiving a new Z value to be stored at a position, reading an old Z value presently stored at the position int he Z buffer; writing the same one of the old Z value or the new Z value to the position in the Z buffer as was written for an immediately preceding series of steps for storing a Z value of an immediately preceding pixel in the repeated sequence, comparing the old Z value at the position of the Z buffer wit the new Z value to be stored at the position; and rewriting the position of the Z buffer if the comparison of the old Z value read from the position of the Z buffer with the new Z value to be stored at the position demonstrates that the value written was farther from the display screen than the Z value which was not written.

2. A method including a series of steps practiced in a repeated sequence for accelerating the writing of data to a buffer memory used to store data indicating a depth of each pixel to be displayed on a display screen (a Z buffer) as claimed in claim 1, the series of steps of the method for storing a depth of each pixel in sequence comprising the further step of stalling writing to additional positions of the Z buffer until the position has been rewritten if the comparison of the old Z value read from the position of the Z buffer with the new Z value to be stored at the position demonstrates that a value written was farther from the display screen than the Z value which was not written.

3. A method for accelerating writing of data to a buffer memory where the writing to the buffer memory depends upon a comparison of old and new data at each position of the buffer memory and positions are written sequentially including the steps of reading an old value presently stored at a first position in the buffer memory, presenting a new value to be written to the first position in the buffer memory, and writing either the new value or the old value conditionally tot he first position in the buffer memory if a result of a last available comparison in a sequence of comparisons of old and new data at a position preceding the first position produced a similar result, and comparing the old value at the first position of the buffer memory with the new value to determine the correctness of the new value conditionally written.

4. Apparatus for accelerating the writing of data to a buffer memory used to store data indicting a depth of each pixel to be displayed on a display screen (a Z buffer) including means for reading an old Z value presently stored at a position in the Z buffer; means for writing the same one of the old Z value or the new Z value to the position in the Z buffer as was written for an immediately preceding pixel means for comparing the old Z value read from the position of the Z buffer with the new Z value; and means for rewriting the position of the Z buffer if the comparison of the old Z value read from the position of the Z buffer with the new Z value demonstrates that the value written was farther from the display screen than the Z value which was not written.

5. Apparatus for accelerating the writing of data to a buffer memory used to store data indicating a depth of each pixel to be displayed on a display screen (a Z buffer) as claimed in claim 4 in which the means for comparing the old Z value read from the position of the Z buffer with the new Z value includes a comparator circuit, and means for furnishing the new Z value and the old Z value read from the position of the Z buffer to the comparator.

6. Apparatus for accelerating the writing of data to a buffer memory used to store data indicating a depth of each pixel to be displayed on a display screen (a Z buffer) as claimed in claim 5 in which the means for rewriting the position of the Z buffer if the comparison of the old Z value read from the position of the Z buffer with the new Z value demonstrates that the value written was farther from the display screen than the Z value which was not written includes means for storing the old Z value read from the position of the Z buffer and the new Z value, and means for selecting the old Z value read from the position of the Z buffer or the new Z value depending on which Z value indicates a position closer to the display screen.

7. Apparatus for accelerating the writing of data to a buffer memory used to store data indicating a depth of each pixel to be displayed on a display screen (a Z buffer) as claimed in claim 4 further comprising means for stalling writing to additional positions of the Z buffer until the position has been rewritten if the comparison of the old Z value read from the position of the Z buffer with the new Z value demonstrates that a value written was farther from the display screen than the Z value which as not written.

* * * * *